(12) United States Patent
Rozenshein et al.

(10) Patent No.: US 10,609,075 B2
(45) Date of Patent: Mar. 31, 2020

(54) MASQUERADING AND MONITORING OF SHARED RESOURCES IN COMPUTER NETWORKS

(71) Applicant: Guardicore Ltd., Tel Aviv (IL)

(72) Inventors: Yoni Rozenshein, Ramat Gan (IL); Ofri Ziv, Herzliya (IL)

(73) Assignee: GUARDICORE LTD., Tel Aviv (IL)

( * ) Notice: Subject to any disclaimer, the term of this patent is extended or adjusted under 35 U.S.C. 154(b) by 307 days.

(21) Appl. No.: 15/492,009

(22) Filed: Apr. 20, 2017

(65) Prior Publication Data
US 2017/0339185 A1    Nov. 23, 2017

Related U.S. Application Data

(60) Provisional application No. 62/339,898, filed on May 22, 2016.

(51) Int. Cl.
H04L 29/06    (2006.01)
G06F 21/00    (2013.01)

(52) U.S. Cl.
CPC ...... H04L 63/1491 (2013.01); H04L 63/1408 (2013.01)

(58) Field of Classification Search
CPC .......... H04L 63/1491; H04L 63/1408
See application file for complete search history.

(56) References Cited

U.S. PATENT DOCUMENTS

| | | | |
|---|---|---|---|
| 7,200,869 B1 * | 4/2007 | Hacherl | G06F 12/1433 726/27 |
| 7,461,402 B1 | 12/2008 | Lyle et al. | |
| 8,918,878 B2 | 12/2014 | Niemela | |
| 9,491,189 B2 | 11/2016 | Zeitlin et al. | |
| 9,526,110 B2 * | 12/2016 | Andrianov | H04W 16/14 |
| 9,576,145 B2 * | 2/2017 | Zhang | G06F 21/6218 |
| 10,009,360 B1 | 6/2018 | Todd et al. | |
| 10,122,752 B1 | 11/2018 | Soman et al. | |
| 2001/0025311 A1 * | 9/2001 | Arai | G06F 21/6218 709/225 |
| 2006/0161982 A1 | 7/2006 | Chari et al. | |
| 2009/0204964 A1 | 8/2009 | Foley et al. | |
| 2013/0318618 A1 | 11/2013 | Nguyen et al. | |
| 2014/0181971 A1 | 6/2014 | Tatarinov et al. | |
| 2015/0058983 A1 * | 2/2015 | Zeitlin | H04L 63/1408 726/23 |

(Continued)

OTHER PUBLICATIONS

U.S. Appl. No. 15/623,401 office action dated May 23, 2019.
U.S. Appl. No. 15/623,401 office action dated Oct. 22, 2019.

*Primary Examiner* — Lisa C Lewis
(74) *Attorney, Agent, or Firm* — Kligler & Associates Patent Attorneys Ltd

(57) ABSTRACT

An apparatus for computer-network security includes a network interface and a processor. The network interface is configured for communicating over a communication network. The processor is configured to detect a request from a first computer to access a non-existent shared resource of a second computer, to send to the first computer, responsively to the request, a response that imitates a genuine grant of access to the non-existent shared resource, so as to initiate an interaction between the first computer and the shared resource, and to process the interaction so as to identify a malicious activity attempted by the first computer.

22 Claims, 1 Drawing Sheet

(56) References Cited

U.S. PATENT DOCUMENTS

| | | |
|---|---|---|
| 2015/0067848 A1 | 3/2015 | Baikalov |
| 2015/0121529 A1 | 4/2015 | Quinlan et al. |
| 2016/0149950 A1 | 5/2016 | Ashley et al. |
| 2016/0180092 A1* | 6/2016 | Aktas .................... G06F 21/562 726/23 |
| 2016/0323316 A1 | 11/2016 | Kolton et al. |
| 2017/0006055 A1 | 1/2017 | Strom et al. |
| 2017/0034189 A1 | 2/2017 | Powell |
| 2017/0180394 A1 | 6/2017 | Crofton et al. |
| 2017/0223031 A1 | 8/2017 | Gu et al. |
| 2017/0324755 A1 | 11/2017 | Dekel et al. |

* cited by examiner

MASQUERADING AND MONITORING OF SHARED RESOURCES IN COMPUTER NETWORKS

CROSS-REFERENCE TO RELATED APPLICATIONS

This application claims the benefit of U.S. Provisional Patent Application 62/339,898, filed May 22, 2016, whose disclosure is incorporated herein by reference.

FIELD OF THE INVENTION

The present invention relates generally to computer network security, and particularly to methods and systems for masquerading and monitoring of shared resources.

BACKGROUND OF THE INVENTION

Various security techniques are known in the art for detecting, analyzing and mitigating attacks on computer networks. For example, U.S. Pat. No. 9,491,189, whose disclosure is incorporated herein by reference, describes techniques for revival and redirection of blocked connections for intention inspection in computer networks. A failed attempt to communicate with a target computer by an initiating computer is identified in monitored traffic. The identified failed attempt is revived by establishing an investigation connection with the initiating computer while impersonating the target computer. Verification is made as to whether the failed attempt was malicious or innocent, by communicating with the initiating computer over the investigation connection.

SUMMARY OF THE INVENTION

An embodiment of the present invention that is described herein provides an apparatus for computer-network security, including a network interface and a processor. The network interface is configured for communicating over a communication network. The processor is configured to detect a request from a first computer to access a non-existent shared resource of a second computer, to send to the first computer, responsively to the request, a response that imitates a genuine grant of access to the non-existent shared resource, so as to initiate an interaction between the first computer and the shared resource, and to process the interaction so as to identify a malicious activity attempted by the first computer.

In an embodiment, the processor is configured to detect that the first computer requests access to a shared file or directory that does not exist in the second computer. In another embodiment, the processor is configured to detect that the first computer requests a list of shared files or directories of the second computer, and to send to the first computer a masqueraded list that includes at least one file or directory that does not exist in the second computer.

In some embodiments, the processor is configured to send to the first computer an authorization to access a shared file or directory, even though the shared file or directory does not exist on the second computer. In an example embodiment, the processor is configured to provide to the first computer content that appears to be stored in the shared file or directory.

In a disclosed embodiment, the request is addressed to an address that does not belong to any genuine second computer, and the processor is configured to send the response from a honeypot. In an alternative embodiment, the processor is configured to send the response from operating system of the second computer.

In some embodiments, the processor is configured to create the shared resource in response to the request, and to conduct the interaction using the created shared resource. In other embodiments, the processor is configured to redirect the request to a predefined shared resource, and to conduct the interaction using the predefined shared resource.

There is additionally provided, in accordance with an embodiment of the present invention, a method for computer-network security, including detecting a request from a first computer to access a non-existent shared resource of a second computer. A response, which imitates a genuine grant of access to the non-existent shared resource, is sent to the first computer responsively to the request, so as to initiate an interaction between the first computer and the shared resource. The interaction is processed so as to identify a malicious activity attempted by the first computer.

The present invention will be more fully understood from the following detailed description of the embodiments thereof, taken together with the drawings in which:

DETAILED DESCRIPTION OF EMBODIMENTS

Overview

In various client-server configurations, it is common for a server to provide clients with access to shared resources. Shared resources may be associated with the server's operating system, or third-party services such as Representational state transfer (REST) Web services. Shared resources may comprise, for example, directories, files, objects, operating-system processes, peripheral devices, and many others. Some malicious attacks on computer networks use such shared resources to gain access to computers, to collect information regarding the network and its computers, or to conduct other malicious activities.

Embodiments of the present invention that are described herein provide methods and systems for detecting and monitoring malicious attempts to access shared resources of servers and computer networks. In some embodiments, a server detects a request to access a non-existent shared resource, i.e., a shared resource that is undefined or unshared in its operating system and associated services. The server concludes that the request is likely to be part of a malicious attack. In order to lure the attacker, the server creates the requested shared resource on-the-fly, and sends the attacking computer a response that imitates a genuine grant to access the shared resource. When the attacking computer starts interacting with the specially-created shared resource, the server monitors the interaction so as to identify, characterize or otherwise analyze the malicious activity attempted by the attacking computer.

In some embodiments the server is a honeypot, which detects attempts to access non-existent shared resources on one or more non-existent IP addresses. In other embodiments the server is a functional server of the network, which, in addition to its conventional tasks, detects attempts to access non-existent shared resources addressed to its own IP address.

In various embodiments, the server may provide various extents of "depth" and complexity in imitating the non-existent shared resource. For example, the server may provide the attacking computer content that appears as belonging to the shared resource. Various example implementations of the disclosed techniques, e.g., examples of shared resources and masquerading techniques, are also described.

System Description

Figure 1:
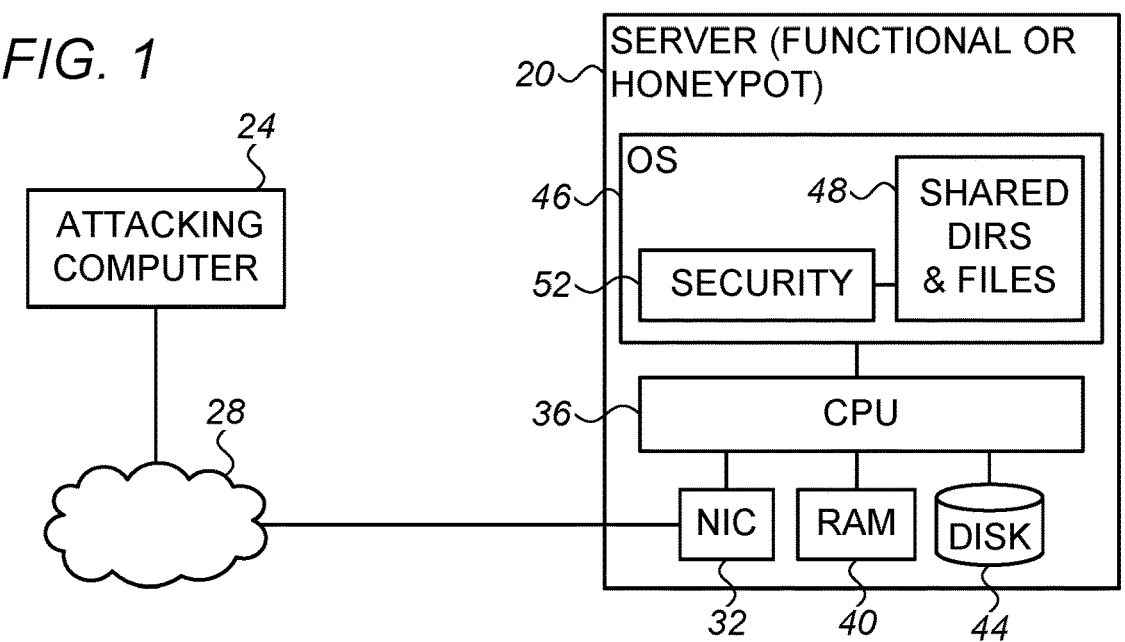
FIG. 1 is a block diagram that schematically illustrates a server that detects and monitors malicious attempts to access shared resources, in accordance with an embodiment of the present invention.

FIG. 1 is a block diagram that schematically illustrates a server 20 that is configured to detect and monitor malicious attempts to access shared resources, in accordance with an embodiment of the present invention. In the present example, server 20 detects attempts of an attacking computer 24 to access shared resources of the server over a network 28.

Network 28 may comprise, for example, a Wide-Area Network (WAN) such as the Internet, an enterprise network, a Local Area Network (LAN) or any other suitable network or combination of networks. Server 20 may comprise any suitable type of computer. In some embodiments server 20 comprises a honeypot, whose dedicated role is to detect attacks. In other embodiments server 20 comprises a functional server (e.g., a Web server or database server) that detects attacks on its own shared resources.

In the present example, server 20 comprises a network interface, e.g., a Network Interface Controller (NIC) 32, for communicating over network 28. The server further comprises a processor, e.g., a Central Processing Unit (CPU) 36 that is configured to carry out the methods described herein. Server 20 typically further comprises elements such as memory, e.g., one or more Random Access Memory (RAM) devices 40, and storage, e.g., one or more disks 44.

CPU 36 of server 20 runs an Operating System (OS) 46, such as Microsoft Windows, Linux or any other suitable type of OS. Among other tasks, OS 46 defines shared resources 48, and allows various clients to access and use the shared resources. In the example of FIG. 1, the shared resources comprise one or more directories and/or files. Other examples of shared resources are listed further below. Generally, in the present context, the term "shared resource" refers to any resource that the server OS permits clients to access and use.

In the disclosed embodiments, OS 48, which runs on CPU 36 of server 20, further runs a security module 52 that detects malicious attempts to access shared resources. The functionality of security module 52 is explained in detail below.

The configuration of server 20 shown in FIG. 1 is an example configuration that is depicted purely for the sake of conceptual clarity. In alternative embodiments, any other suitable server configuration can be used. The different server elements shown in FIG. 1 may be implemented using any suitable hardware, such as in an Application-Specific Integrated Circuit (ASIC) or Field-Programmable Gate Array (FPGA). Alternatively, the various server elements can be implemented using software, or using a combination of hardware and software elements.

In some embodiments, CPU 36 of server 20 comprises one or more processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Detection and Investigation of Malicious Activity by Masquerading Shared Resources In some types of malicious attacks on servers, an attacking computer attempts to access a non-existent shared resource, i.e., a shared resource that is undefined or unshared by the OS and services of the server. For example, some malware types are configured to spread via a particular shared directory. Human attackers are also known to attempt gaining access or information via shared resources. If the shared resource in question does not exist on a particular server, an attempt to access this shared resource may be indicative of an attack.

Figure 2:
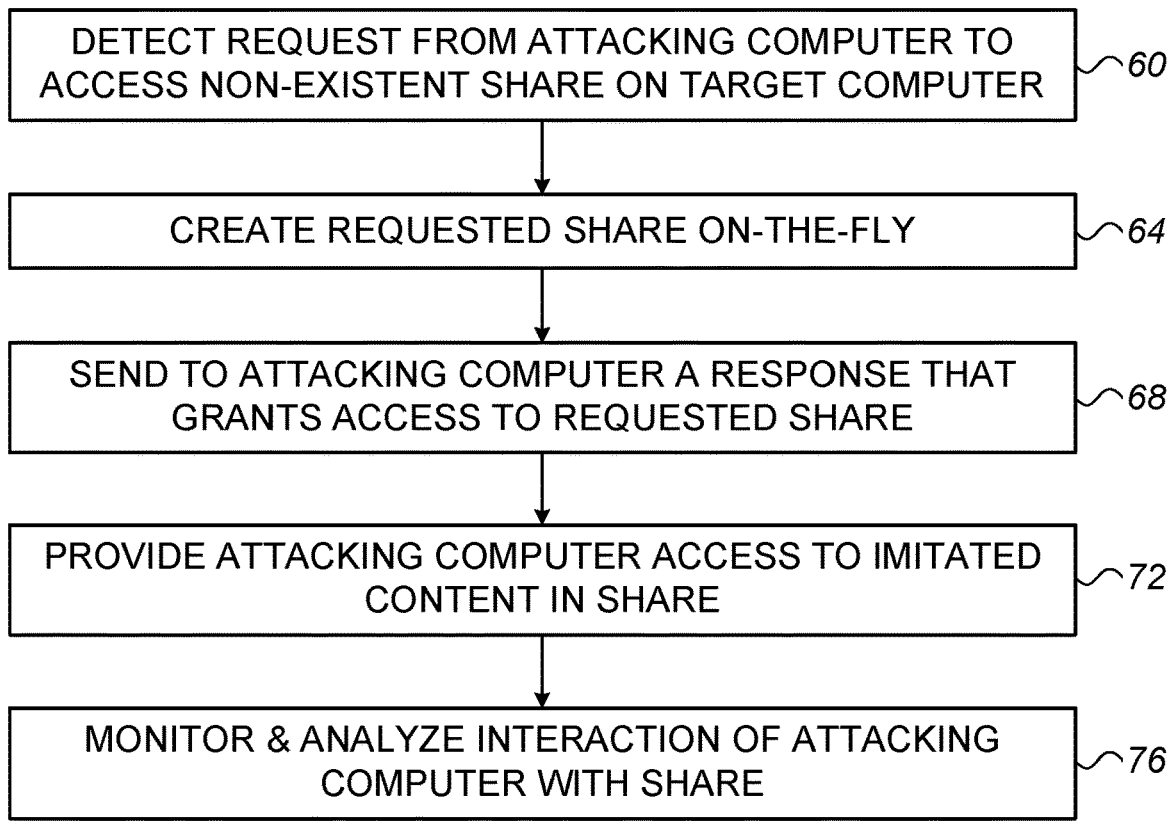
FIG. 2 is a flow chart that schematically illustrates a method for detection and monitoring of malicious attempts to access shared resources, in accordance with an embodiment of the present invention.

FIG. 2 is a flow chart that schematically illustrates a method for detection and monitoring of malicious attempts to access shared resources, in accordance with an embodiment of the present invention. The method begins at a detection step 60, with security module 52 (a software module running in OS 46 of server 20) detecting a request from attacking computer 24 to access a non-existent shared resource of OS 46.

In an example embodiment, module 52 monitors the requests received by server 20, compares the requested resources to the existing shared resources 48, and decides whether the request is for an existing or for a non-existent shared resource.

At a resource creation step 64, module 52 creates the (previously non-existent) shared resource that the attacking computer requested to access. For example, if the request was for some shared directory or file, module 52 creates this shared directory or file in OS 46. Module 52 creates the shared resource in real-time, on-the-fly, based on the request detected at step 60.

At a responding step 68, module 52 sends to attacking computer 24 a response that grants access to the requested shared resource.

In some embodiments, module 52 does not only create the shared resource, but also fills it with content that appears genuine, at a content provisioning step 72. This feature typically increases the time period over which the attacker will engage with the shared resource, and enhances the quality of information that can be extracted from this interaction.

For example, when the request is for access to a shared directory, module 52 may create in this directory one or more files that would normally be expected to be found there. When the request is for access to a shared file, module 52 may create the file with content that appears genuine, e.g., matches the file type or file name.

At this stage, attacking computer 24 would typically access the shared resource in question, and interacts with it. At an analysis step 76, module 52 processes the interaction so as to study and characterize the attack, or extract any relevant information. Module 52 may track, for example, data that is exchanged between the attacking computer and the shared resource, actions performed by the attacking computer in the shared resource, or any other sort of interaction.

In some embodiments module 52 merely records the interaction or selected parts thereof, and provides this information for some external system for analysis. This sort of recording is also regarded as "processing the interaction."

The method flow of FIG. 2 is an example flow that is chosen purely for the sake of conceptual clarity. In alternative embodiments, any other suitable flow can be used.

Additional Embodiments and Variations

The description above referred mainly to shared files and directories. The disclosed techniques, however, are applicable to various other types of shared resources. Some additional non-limiting examples of shared resources are listed below:
- Server Message Block (SMB) servers provide "shares," which clients may enumerate and/or connect to, in order to access resources such as files, directories, printers and the like. The connection operation in SMB is referred to as "tree connect".
- Another type of shared resource provided by SMB servers is "Named pipes." Named pipes are provided via a special "IPC$" share, which a client may connect to and communicate with.
- Servers utilizing the Distributed Computing Environment/Remote Procedure Calls (DCE/RPC) protocol, provide "interfaces" that may be chosen by clients using the "bind" operation. Subsequently, operations such as remote procedure calls may be issued by the clients. In addition to RPC interfaces, the RPC server may host Component Object Model (COM) objects that may be created and accessed remotely using Distributed Component Object Model (DOOM).
- Java Remote Method Invocation (Java RMI) servers provide "remote objects" that clients may look-up in a remote RMI registry using the lookup operation, and then issue remote method invocations on the desired object.
- Windows Management Infrastructure (WMI) allows clients to communicate with chosen "providers."
- Servers built using the Representational State Transfer (REST) architecture provide resources, identified using Uniform Resource Identifiers (URIs), which clients may access to obtain data, upload data and issue commands.

The description above referred mainly to module 52 creating a previously-nonexistent shared resource on-the-fly, in response to a request from the attacking computer. In alternative embodiments, the shared resource may be created in advance rather than on-the-fly. For example, module 52 may create in advance a shared directory that is expected to be accessed by known malware. If attacking computer 24 indeed requests access to this directory, the process may continue according to steps 68-76 of FIG. 2.

In another embodiment, instead of creating the requested shared resource on-the-fly, module 52 redirects the request to an existing shared resource (on server 20 or on another server), or acts as a proxy for an existing shared resource (on server 20 or on another server). The interaction with the attacking computer is thus performed using the existing shared resource, which appears to the attacking computer to be the requested resource. In an embodiment, the existing shared resource is also used for normal operation of server 20. In an example embodiment, the existing shared resource has a certain functionality, structure or logic when used normally in the server, and module 52 modifies this functionality, structure or logic when using this resource for masquerading as the non-existent resource requested by the attacking computer.

In one example scenario, server 20 comprises an SMB server. Attacking computer 24 attempts to access an SMB share whose name is known to the attacker, but revealed to module 52 only when receiving the request from the attacking computer. A share having this name does not previously exist in the server. Without the disclosed techniques, the attack will fail immediately, and no additional information can be extracted or learned from it. When using the disclosed techniques, module 52 will allow the attack to proceed, e.g., by creating the requested share on-the-fly or redirecting the request and subsequent data and actions to some existing share such as "C$" or "ADMIN$".

In another example scenario, a worm or other malware attempts to access an RPC/RMI interface in order to exploit a vulnerability. In this example, the vulnerability is known and has already been patched in OS 46 of server 20. Alternatively, the payload sent by the attacking computer does not match the OS version or other parameters of the server. As in the previous scenario, without the disclosed techniques the attack will fail immediately and no additional information can be extracted or learned from it. When using the disclosed techniques, module 52 may masquerade the vulnerable RPC/RMI interface, and emulate the vulnerability so as to allow the attack to proceed. In an example implementation, the vulnerable RPC/RMI interface may be masqueraded and re-implemented by placing and executing the shellcode delivered in the attack payload. In this manner, the attack is allowed to proceed, in order to investigate it, even though it does not match the OS version or other server parameters.

In some embodiments, attacking computer 24 sends to server 20 a request to enumerate the list of shared resources available on the server. In the present context, such a request is also regarded as a request to access a shared resource. Upon detecting this request, module 52 may create, on-the-fly, a masqueraded list of shared resources and send the list to the attacking computer. In some embodiments the masqueraded list comprise both the genuinely-available shared resources (resources 48), plus one or more shared resources that module 52 creates on-the-fly in order to lure the attacker. If the attacker requests access to one of the specially-created shared resources, the process may proceed in accordance with steps 68-76 of FIG. 2.

In an example embodiment, masquerading a share in Windows SMB server is implemented as follows:
- Set up the Windows SMB server with one or more pre-configured shares.
- In the kernel module srv.sys, hook the function SrvSmbTreeConnectAndX, which is responsible for handling access to SMB shares.
- Inside the hook, wait until the SrvFindShare function has been called. This function is responsible for looking up a share's memory structure given its name.
- Replace the original implementation of SrvFindShare with the following custom implementation:
  - Scan the memory structure containing the list of shares.
  - Search for the requested share name (a parameter of the function).
  - If the share name has been found, return its corresponding memory structure.
  - If the share name has not been found, return the memory structure corresponding to a different share that was chosen in advance for this purpose, such as "C$".

The information collected from the attacks by security module 52 (e.g., the list of accessed shared resources) can be used in any suitable way and for any suitable purpose. For example, the collected information can be used as (or converted into) a signature database for intrusion detection and prevention systems (for example an antivirus).

Moreover, the disclosed techniques are not limited to security applications and can be used, for example, in network management. For example, the disclosed techniques can be used for detecting misconfiguration of network applications that access shared resources (e.g., printing manager).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for computer-network security, comprising:
   a network interface, for communicating over a communication network; and
   a processor included in a computer system, the processor configured with:
      an operating system; and
      a software security module running in the operating system, configured to compare requests for shared resources with a list of available shared resources, to detect from the comparison, a request to access a resource of the processor not on the list of available shared resources, and to direct the request to a monitored resource,
      wherein the monitored resource is configured to send to a remote computer from which the detected request was received, responsively to the request, a response that imitates a genuine grant of access to the requested resource, so as to initiate an interaction between the remote computer and the monitored resource, and to process the interaction so as to identify a malicious activity attempted by the remote computer,
      wherein the software security module is configured to detect the request to access a resource not on the list of available shared resources by detecting a request which does not match a parameter of the computer system.

2. The apparatus according to claim 1, wherein the requests for shared resources comprise requests for shared files or directories.

3. The apparatus according to claim 1, wherein the processor is further configured to detect requests for a list of shared files or directories, and to send a masqueraded list that comprises at least one file or directory that does not exist in the computer system of the processor.

4. The apparatus according to claim 1, wherein the monitored resource is configured to send to the remote computer an authorization to access a shared file or directory, even though the shared file or directory does not exist on the computer system of the processor.

5. The apparatus according to claim 4, wherein the processor is configured to provide to the remote computer content that appears to be stored in the shared file or directory.

6. The apparatus according to claim 1, wherein the request is addressed to an address that does not belong to any genuine computer, and wherein the processor is configured to send the response from a honeypot.

7. The apparatus according to claim 1, wherein the software security module is configured to create the requested resource in response to the request.

8. The apparatus according to claim 1, wherein the software security module is configured to redirect the request to a predefined shared resource, which is configured to conduct the interaction.

9. The apparatus according to claim 8, wherein the software security module is configured to redirect the request to a server separate from the computer system.

10. The apparatus according to claim 8, wherein the software security module is configured to modify an existing resource to serve as the monitored resource, responsive to the request, and to redirect the request to the modified resource.

11. The apparatus according to claim 1, wherein the software security module is configured to detect the request to access a resource not on the list of available shared resources by detecting a request which does not match an operating system version of the computer system.

12. The apparatus according to claim 1, wherein the software security module is invoked by a hook to a function which is responsible for handling access to a type of resources to which the requested resource belongs.

13. A method for computer-network security, comprising:
   detecting, by a software security module running in an operating system of a computer system, a request to access a resource of the computer system not included in a list of available shared resources, wherein the requested resource comprises a directory;
   responsively to the request, creating the requested directory as a monitored resource, along with one or more files in the directory;
   directing the request by the software security module to the monitored resource;
   sending to a remote computer from which the detected request was received, a response that imitates a genuine grant of access to the requested resource, so as to initiate an interaction between the remote computer and the monitored resource; and
   processing the interaction so as to identify a malicious activity attempted by the remote computer.

14. The method according to claim 13, wherein detecting the request comprises detecting a request to access a shared file or directory that does not exist in the computer system.

15. The method according to claim 13, further comprising detecting by the software security module requests for a list of shared files or directories, and sending to the remote computer a masqueraded list that comprises at least one file or directory that does not exist in the computer system.

16. The method according to claim 13, wherein sending the response comprises sending to the remote computer an authorization to access a shared file or directory, even though the shared file or directory does not exist on the computer system.

17. The method according to claim 16, and comprising providing to the remote computer content that appears to be stored in the shared file or directory.

18. The method according to claim 13, wherein the request is addressed to an address that does not belong to any genuine computer, and wherein sending the response is performed by a honeypot.

19. The method according to claim 13, and comprising creating the shared resource in response to the request.

20. The method according to claim 13, and comprising redirecting the request to a predefined shared resource.

21. An apparatus for computer-network security, comprising:
   a network interface, for communicating over a communication network; and
   a processor included in a computer system, the processor configured with:
      an operating system; and
      a software security module running in the operating system, configured to compare requests for shared resources with a list of available shared resources, to detect from the comparison, a request to access a resource of the processor not on the list of available shared resources, and to direct the request to a monitored resource,
   wherein the monitored resource is configured to send to a remote computer from which the detected request was received, responsively to the request, a response that imitates a genuine grant of access to the requested resource, so as to initiate an interaction between the remote computer and the monitored resource, and to process the interaction so as to identify a malicious activity attempted by the remote computer,
   wherein the software security module is configured to create the requested resource in response to the request, and wherein the requested resource comprises a directory and wherein the software security module is configured to create the requested directory along with one or more files in the directory, in response to the request.

22. An apparatus for computer-network security, comprising:
   a network interface, for communicating over a communication network; and
   a processor included in a computer system, the processor configured with:
      an operating system; and
      a software security module running in the operating system, configured to compare requests for shared resources with a list of available shared resources, to detect from the comparison, a request to access a resource of the processor not on the list of available shared resources, and to direct the request to a monitored resource,
   wherein the monitored resource is configured to send to a remote computer from which the detected request was received, responsively to the request, a response that imitates a genuine grant of access to the requested resource, so as to initiate an interaction between the remote computer and the monitored resource, and to process the interaction so as to identify a malicious activity attempted by the remote computer,
   wherein the requested resource is a Remote Procedure Call (RPC) interface or a Remote Method Invocation (RMI) interface and wherein the software security module is configured to retrieve a shellcode from the request and execute the shellcode to masquerade the requested resource.

* * * * *